W. RAABE.
APPARATUS FOR EXTRACTION OF SUGAR JUICES.
APPLICATION FILED OCT. 29, 1912.

1,089,495.

Patented Mar. 10, 1914.

2 SHEETS—SHEET 2.

Witnesses
Chas W. Stauffiger
C. R. Stickney

Inventor
Walter Raabe,
By
Attorneys

UNITED STATES PATENT OFFICE.

WALTER RAABE, OF CÖTHEN, GERMANY, ASSIGNOR OF ONE-HALF TO EDWARD C. POST, OF ANN ARBOR, MICHIGAN.

APPARATUS FOR EXTRACTION OF SUGAR-JUICES.

1,089,495.      Specification of Letters Patent.      Patented Mar. 10, 1914.

Application filed October 29, 1912. Serial No. 728,467.

*To all whom it may concern:*

Be it known that I, WALTER RAABE, a subject of the Emperor of Germany, residing at Cöthen, in the Duchy of Anhalt, Germany, have invented certain new and useful Improvements in Apparatus for Extraction of Sugar-Juices, of which the following is a specification, reference being had therein to the accompanying drawings.

The use of screw conveyers for carrying sliced beets or shredded cane or the like in a diffusion liquid in apparatus for continuous operation has the drawback that the convolutions of such a conveyer frequently press or mat the slices too much together to permit of a free individual contact of each particle of the mass treated, and thus of a complete extraction of the juices thereof.

The object of this invention is to overcome the above noted objectionable feature and to provide means for readily carrying on an extraction or diffusion process continuously.

The invention consists in the matters hereinafter set forth and more particularly pointed out in the appended claims.

Figure 1:
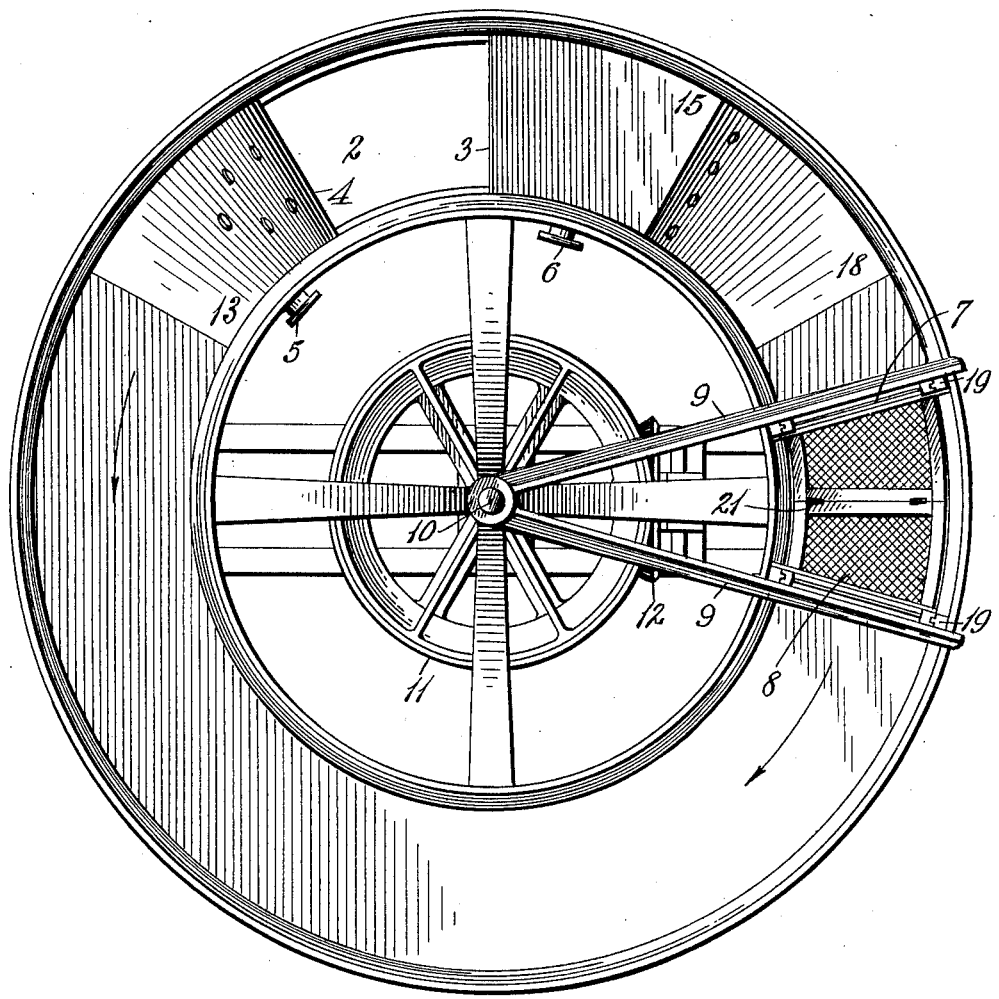
Figure 2:
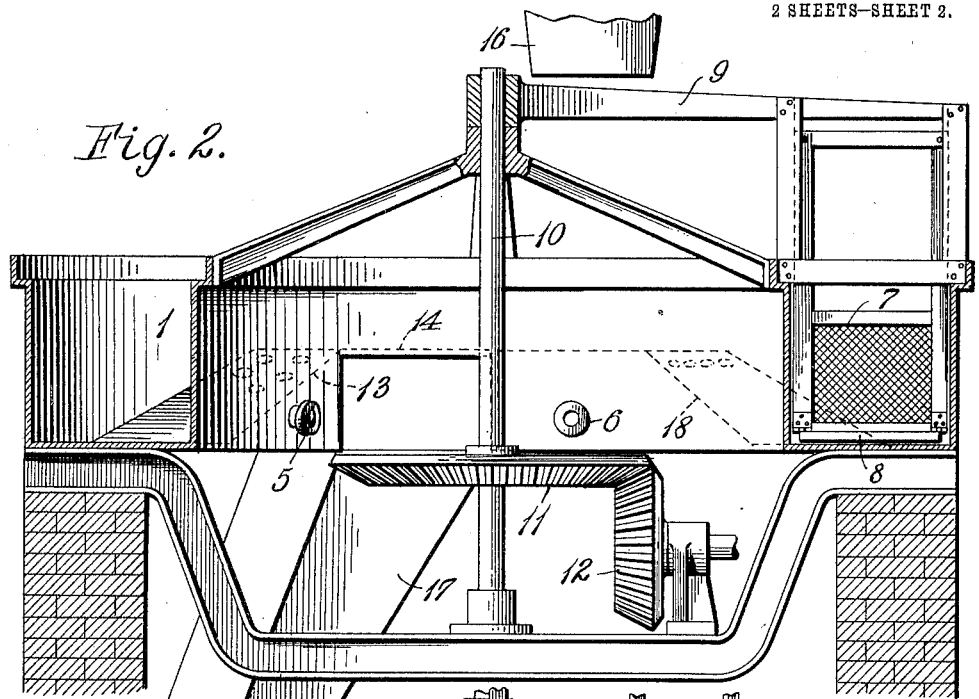
Figure 3:
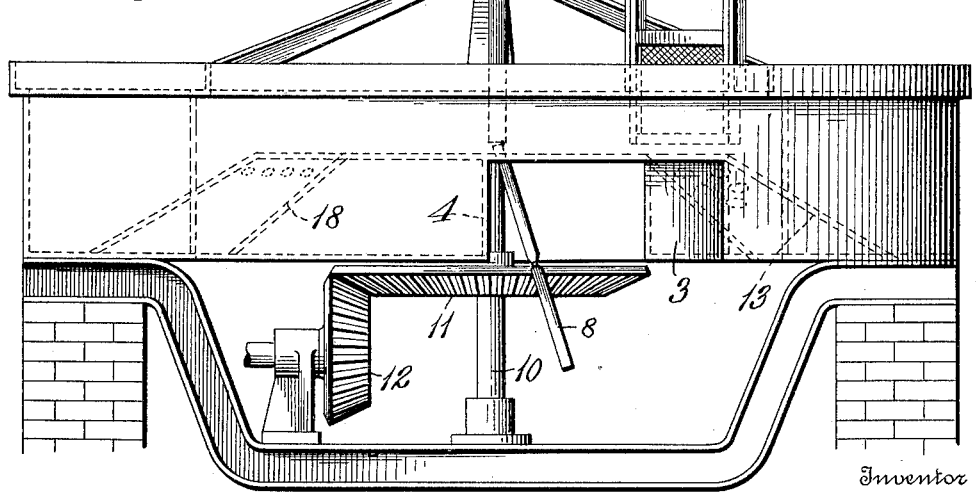

In the drawings, Figure 1 is a plan view of the apparatus that embodies features of the invention; Fig. 2 is a view, partially in side elevation, partially in section, of the apparatus showing the cage in lowered and closed position; Fig. 3 is a view in side elevation showing the cage raised previous to discharged position.

A suitable casing or frame has a horizontal channel 1 of rectangular or other cross-section provided at one point with an opening 2 in its bottom inclosed between two transverse partitions 3, 4 and adjacent to the same, with an inlet opening 5 for the admission of fresh water or diffusion liquid or the like and with an outlet 6 for the resulting extracted sugar juice. A cage 7 provided with a drop bottom 8 is arranged to travel in the channel 1 and is suspended from arms 9 which are rotatively supported upon a central spindle 10 in such manner that by means of bevel gearing 11, 12 or the like, the cage is caused to sweep the channel in the direction of the arrow in Fig. 2. By means of an upward incline 13 which is perforated to permit the liquid to flow through, the cage is raised up to pass over the cross-partitions 3, 4 and rides on horizontal guides 14 (Fig. 2) over the opening 2, while the bottom 8 of the cage drops open and discharges its contents therethrough. In further travel, the bottom of the cage is again closed by passing over the partition 4 or is closed by other suitable means. The bottom 8 of the cage is just wide enough to permit it to drop between the guides 14 in passing over the discharge opening, and is preferably composed of two sections united by hinges 21, but it may be made of more than two sections to insure its perfect operation. The forward section is likewise pivoted at its forward edge to the cage so that as it passes over the partition 4 it is turned back into horizontal position, the other section or sections being likewise folded up to close the cage bottom. The cage is charged with sliced beets or shredded cane or the like immediately after passing the opening 2, preferably from a platform 15 adjacent to the partition 3 through a hopper 16 (Fig. 2) or the like. The sliced beets or shredded cane or the like are carried hence through the whole length of the channel 1 to be discharged again in passing over the opening 2 which conducts them into a discharge spout 17. After receiving its fresh charge, the cage is again gradually dropped into the channel by traveling over a perforated downward incline 18 similar to the upward incline 13 which form chambers at the opposite ends of the channel with which the inlet 5 and outlet 6 respectively communicate. The front and rear walls are each slidingly secured in frames 19 depending from the arms 9, so that these walls can freely rise and fall when the cage passes over the incline.

Instead of a single cage a train of cages may be provided so that when one is being filled another may be discharged and in this way the apparatus will be made to work continuously instead of intermittently. Such a train may be supported from a ring which is carried by arms on the spindle, or one single cage extending the whole length of the channel and divided into separate compartments with drop bottoms for each compartment may be used, all of which is obviously within the scope of the invention and need not be further described.

As shown in the drawings the front and rear walls of the cage are perforated or wire screens conformable to the cross-section of the channel (Fig. 2) while the bottom, also of wire screen, is hingedly connected to the front wall and extends rearwardly to the rear wall. The cage has no side walls but is inclosed upon the sides by the upright walls of the channel. During the travel the beet slices or shredded cane or the like are not subjected to compression and as a result a complete and thorough extraction is obtained.

What I claim is:—

1. An extraction apparatus comprising a casing having an annular channel provided with two transverse adjacent partitions, an opening in its bottom between the partitions, a carrying member adapted to traverse the channel and provided with a drop bottom, means for driving the carrying member around the channel, and guiding means in the channel for passing the carrying member over the partitions and the opening and releasing the discharge bottom of the member when in substantial register with the opening.

2. An extraction apparatus comprising a casing having a horizontal annular channel, transverse partitions therein on either side of an opening in the bottom, a carrying member adapted to traverse the channel and provided with a drop bottom, driving mechanism for revolving the carrying member around the channel and guides adapted to elevate the carrying member to move across the partition, the drop bottom of the carrier being adapted to open automatically when the carrier is substantially in register with the channel opening and to close when the carrier moves away from the opening over the adjacent partition.

3. An extraction apparatus comprising a casing provided with an annular channel, a pair of separated transverse partitions in the channel on either side of an opening through the bottom thereof, an inclined guiding member leading upward from the top of one partition, guides between the partitions over the opening, a carrying member adapted to sweep the channel and provided with a drop bottom that automatically opens when the carrier traverses the guides substantially in register with the channel opening, and means for driving the carrying member around the channel.

4. An extraction apparatus comprising a casing having a substantially horizontal annular channel with an opening in its bottom, a diffusion liquid inlet opening and a liquid outlet opening, a pair of transverse partitions across the channel at the sides of the opening, a perforated inclined guide extending from the lower portion of the channel to the upper margin of one of the partitions, substantially horizontal guides bridging the interval between the partitions at the top thereof, a cage adapted to sweep the channel and provided with a drop bottom that is released automatically when the cage is substantially in register with the channel opening between the partitions, and means for revolving the cage in the channel.

5. An extraction apparatus comprising a casing having a substantially horizontal annular channel with an opening in its bottom, a diffusion liquid inlet opening and a liquid outlet opening, a pair of transverse partitions across the channel at the sides of the opening, a perforated inclined guide extending from the lower portion of the channel to the upper margin of one of the partitions, substantially horizontal guides bridging the interval between the partitions at the top thereof, a cage adapted to sweep the channel and provided with a drop bottom that is released automatically when the cage is substantially in register with the channel opening between the partitions, a spindle concentric in axial co-incidence with the channel, arms journaled at one end of the spindle and secured to the cage, and gearing for rotating the arms of the cage.

6. An extraction apparatus comprising a casing having an annular channel provided with two transverse adjacent partitions and an opening in its bottom between the partitions, carrying means traversing the channel and delivering through the opening whenever in register therewith, means for driving the carrying means around the channel, and means for guiding the carrying means over the partitions and the opening.

7. An extraction apparatus comprising a casing having an annular channel provided with two transverse adjacent partitions and an opening in its bottom between the partitions, perforated inclined guides leading from the bottom of the channel to the top of each partition and bridging an inlet and an outlet for washing liquor in the channel, carrying means adapted to sweep the channel and the inclined guides and provided with a drop bottom that is released automatically when the carrying means registers with the channel opening between the partitions, and means for moving the carrying means around the channel.

8. An extraction apparatus comprising a casing having a substantially horizontal annular channel with an opening in its bottom, a pair of transverse partitions across the channel at the sides of the opening and a washing liquor inlet near one partition and a washing liquor outlet near the other partition, perforated inclined guides extending from the bottom of the channel to the upper margins of the partitions and bridging the washing liquor inlet and outlet, guides bridging the interval between the partitions, carrying means adapted to sweep the channel and to traverse the inclined guides and guides between the partitions and to deliver through the bottom opening of the channel when in register therewith between the partitions, and means for driving the carrying means around the channel.

9. An extraction apparatus comprising a casing having a substantially horizontal annular channel with an opening in its bottom, a pair of transverse partitions across the channel at the sides of the opening, a washing liquid inlet opening near one partition and a washing liquid outlet near the other partition, perforated inclined guides extending from the bottom of the channel to the upper margins of the partitions, a cage adapted to sweep the channel and inclined guides and provided with a drop bottom that opens automatically when the cage is over the channel opening between the partitions, and means for revolving the cage in the channel.

In testimony whereof I affix my signature in presence of two witnesses.

WALTER RAABE.

Witnesses:
 E. C. POST,
 L. RHOADES.